(12) United States Patent
Kashikar et al.

(10) Patent No.: US 10,857,667 B2
(45) Date of Patent: Dec. 8, 2020

(54) METHODS AND APPARATUS FOR CONTROLLING MOTION OF AN ARTICULATED ROBOT

(71) Applicant: Arevo, Inc., Santa Clara, CA (US)

(72) Inventors: Archana Kashikar, Mountain View, CA (US); Wiener Mondesir, Oakland, CA (US)

(73) Assignee: Arevo, Inc., Milpitas, CA (US)

( * ) Notice: Subject to any disclaimer, the term of this patent is extended or adjusted under 35 U.S.C. 154(b) by 95 days.

(21) Appl. No.: 16/379,299

(22) Filed: Apr. 9, 2019

(65) Prior Publication Data

US 2020/0324403 A1 Oct. 15, 2020

(51) Int. Cl.

| | |
|---|---|
| *B25J 9/00* | (2006.01) |
| *B33Y 30/00* | (2015.01) |
| *B33Y 50/02* | (2015.01) |
| *B25J 15/00* | (2006.01) |
| *B25J 9/16* | (2006.01) |
| *B25J 11/00* | (2006.01) |
| *G05B 19/4099* | (2006.01) |

(52) U.S. Cl.
CPC .......... *B25J 9/0096* (2013.01); *B25J 9/1612* (2013.01); *B25J 9/1669* (2013.01); *B25J 11/005* (2013.01); *B25J 15/0076* (2013.01); *B33Y 30/00* (2014.12); *B33Y 50/02* (2014.12); *G05B 19/4099* (2013.01)

(58) Field of Classification Search
CPC .... B25J 9/0096; B25J 9/1612; B25J 15/0076; B25J 9/1669; B25J 11/005; B33Y 50/02; B33Y 30/00; G05B 19/4099
See application file for complete search history.

(56) References Cited

U.S. PATENT DOCUMENTS

| | | | |
|---|---|---|---|
| 9,656,429 B1 | 5/2017 | Mantha et al. | |
| 9,895,845 B2 | 2/2018 | Bheda et al. | |
| 10,011,073 B2 | 7/2018 | Bheda | |
| 10,046,511 B1 | 8/2018 | Mantha | |
| 10,076,870 B1 | 9/2018 | August et al. | |
| 10,195,786 B1 | 2/2019 | Armijo et al. | |
| 2015/0077215 A1* | 3/2015 | Ranky | H05K 3/1258 338/47 |
| 2015/0251356 A1* | 9/2015 | Batchelder | B33Y 50/02 700/98 |
| 2016/0176118 A1 | 6/2016 | Reese et al. | |
| 2016/0236414 A1* | 8/2016 | Reese | B33Y 50/02 |
| 2017/0123407 A1* | 5/2017 | Shiihara | G05B 19/4099 |
| 2017/0266884 A1* | 9/2017 | Maeda | B29C 64/106 |
| 2018/0236729 A1 | 8/2018 | Mondesir | |
| 2019/0193328 A1 | 6/2019 | Mantha | |

* cited by examiner

*Primary Examiner* — Ziaul Karim
(74) *Attorney, Agent, or Firm* — Peter H. Priest; Kenneth Ottesen

(57) ABSTRACT

An article of manufacture is disclosed that is formed by jointly controlling a printhead and a worktable to provide three dimensional printing and insuring every point in a three dimensional print volume can be reached. Similarly, systems and methods are described to extend robot reach by coordinating robot and worktable control.

7 Claims, 8 Drawing Sheets

METHODS AND APPARATUS FOR CONTROLLING MOTION OF AN ARTICULATED ROBOT

TECHNICAL FIELD

The present invention relates generally to aspects of three dimensional (3D) printing and additive manufacturing of three-dimensional articles, and, more particularly, to improved techniques for controlling the motion of a work table and the print head of an articulated robot to generate three dimensional articles of manufacture with true three dimensional tool paths as addressed further herein.

BACKGROUND

In general, there are two complementary approaches to fabricate an article of manufacture: additive manufacturing and subtractive manufacturing.

Additive manufacturing involves aggregating material to form the desired article of manufacture. In contrast, subtractive manufacturing involves removing material to form the desired article of manufacture. In practice, many articles of manufacture are fabricated using a combination of additive and subtractive techniques.

A form of additive manufacturing—colloquially known as "3D printing"—is the subject of intense research and development because it enables the fabrication of articles of manufacture with complex geometries. Furthermore, 3D printing enables the mass customization of articles of manufacture with different dimensions and characteristics. While there have been many advances, there remain, however, many challenges in the design, manufacture, and use of 3D printers, as well as, in the advancement of 3D printing processes. Such printing typically involves robot control of a print or deposition head along a tool path.

SUMMARY OF THE INVENTION

Among its several aspects, the present invention recognizes as a general matter, that just as it is hard to trace certain lines in space with one's fingertip, a typical robot, such as a six axis robot, for example, cannot reach every point in a work volume in a continuous printing manner without stopping printing, lifting the print head and adjusting various articulated joints or defining the work volume in an undesirably limited manner. With the printing of fiber reinforced filament, it is important to follow a continuous tool path to the extent practical to do so and to be able to place the print head flat or perpendicular to the points where filament is to be deposited. In true three dimensional printing as addressed herein a segment or segments of the tool path involve deposition head movement in the x, y and z dimensions. Further, the present invention recognizes that it is highly advantageous to provide true three dimensional printing in a manner which is quick, flexible and efficient. To such ends, the present invention addresses the need to be able to print at any point in a three dimensional space defining a build volume. It is also advantageous and in some environments required to be able to approach any point in the build volume from any direction. Further, the present invention recognizes the desirability of repeatable and reliable techniques readily adaptable to irregularly shaped three dimensional articles having complex geometries, such as parts having overhangs, and the like. Further, the present invention provides a speed advantage by reducing the need to cut a fiber reinforced filament and lift the printhead to allow readjustment of the controlling axes of rotation.

Embodiments of the present invention enable an article to be fabricated with fiber reinforced filament with techniques that are repeatable and regular as addressed further herein. According to one aspect of the present invention, the object to be printed is printed on a turntable. By properly controlling the rotation of the turntable as addressed further herein it becomes possible to reach any point in the work volume from any point in the work volume. Put alternatively, if an existing 6-axis robot is considered as being able to reach every point in a work volume that has limitations caused by the interoperability and interaction of the joints, the present invention may be viewed as increasing the accessible work volume thereby supporting the rapid three dimensional printing of additional articles not previously capable of being printed without stopping, lifting the printhead, cutting the fiber reinforced filament and readjusting the printhead.

A further aspect of the present invention addresses a method of increasing effective robot reach utilizing build plate rotation in robotic processes requiring a continuous path of movement by a tool, such as a deposition head, with respect to a work piece.

According to another aspect of the invention, an article of manufacture formed by three dimensional printing is described which utilizes a controllable print head to print lengths of fiber reinforced filament along an article tool path to form an article utilizing a tool path generated by utilizing computer aided design software to represent part geometry in a standard language file; utilizing slicing software to take the standard language file and slice the article into layers of toolpath; for each layer a toolpath, generating a sequence of points defining a toolpath in a Gcode file; converting the Gcode file to an alternate Gcode file which eliminates rotation about at least one axis of rotation of a robot controlling movement of the print head and adds work table control code to control rotation of a work table; converting the alternate G file to convert set alternate G file into a text file the robot can interpret to execute motion and input/output (JO) commands to control printhead travel; and utilizing the alternate Gcode file to control the work table to rotate thereby insuring toolpath points that are required to make the part reachable. A more complete understanding of the present invention, as well as further features and advantages of the invention, will be apparent from the following Detailed Description and the accompanying drawings.

DETAILED DESCRIPTION

Figure 1:
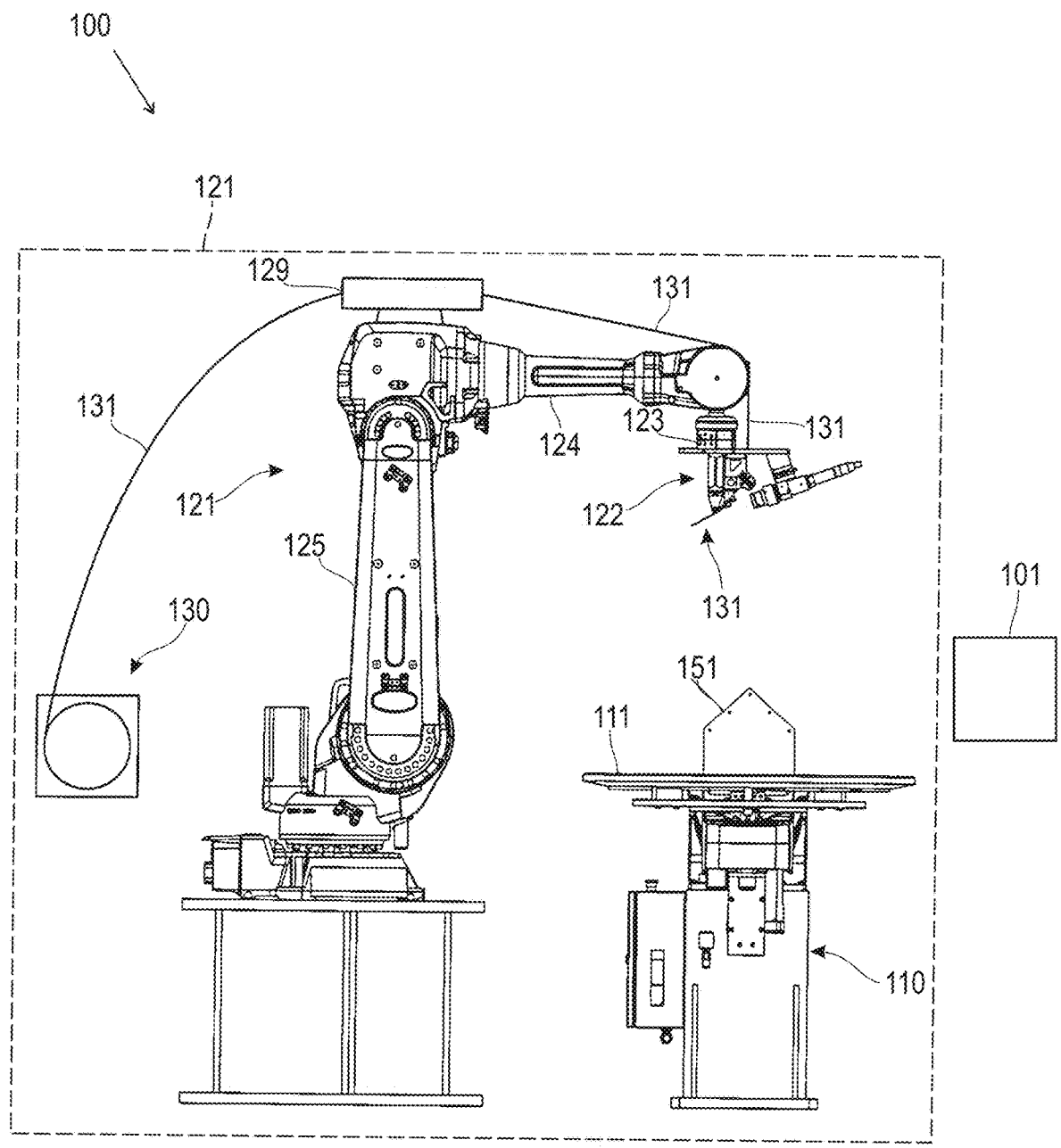
FIG. 1 depicts an illustration of the components of an additive manufacturing system suitably adapted to generate three dimensional article printing tool paths and printing articles of manufacture in accordance with an illustrative embodiment of the present invention.

FIG. 1 depicts an illustration of the components of an exemplary additive manufacturing system 100 in accordance with illustrative embodiments of the present invention. Additive manufacturing system 100 comprises: controller 101, turntable 110, deposition build plate 111, robot 121, deposition head 122, filament conditioning unit 129, filament source 130, and thermoplastic filament 131. The purpose of manufacturing system 100 is to fabricate articles of manufacture. It will be recognized that the teachings of the present invention are applicable to a wide range of manufacturing systems, processes, and articles of manufacture, and the particular illustrations herein are exemplary.

Figure 8:
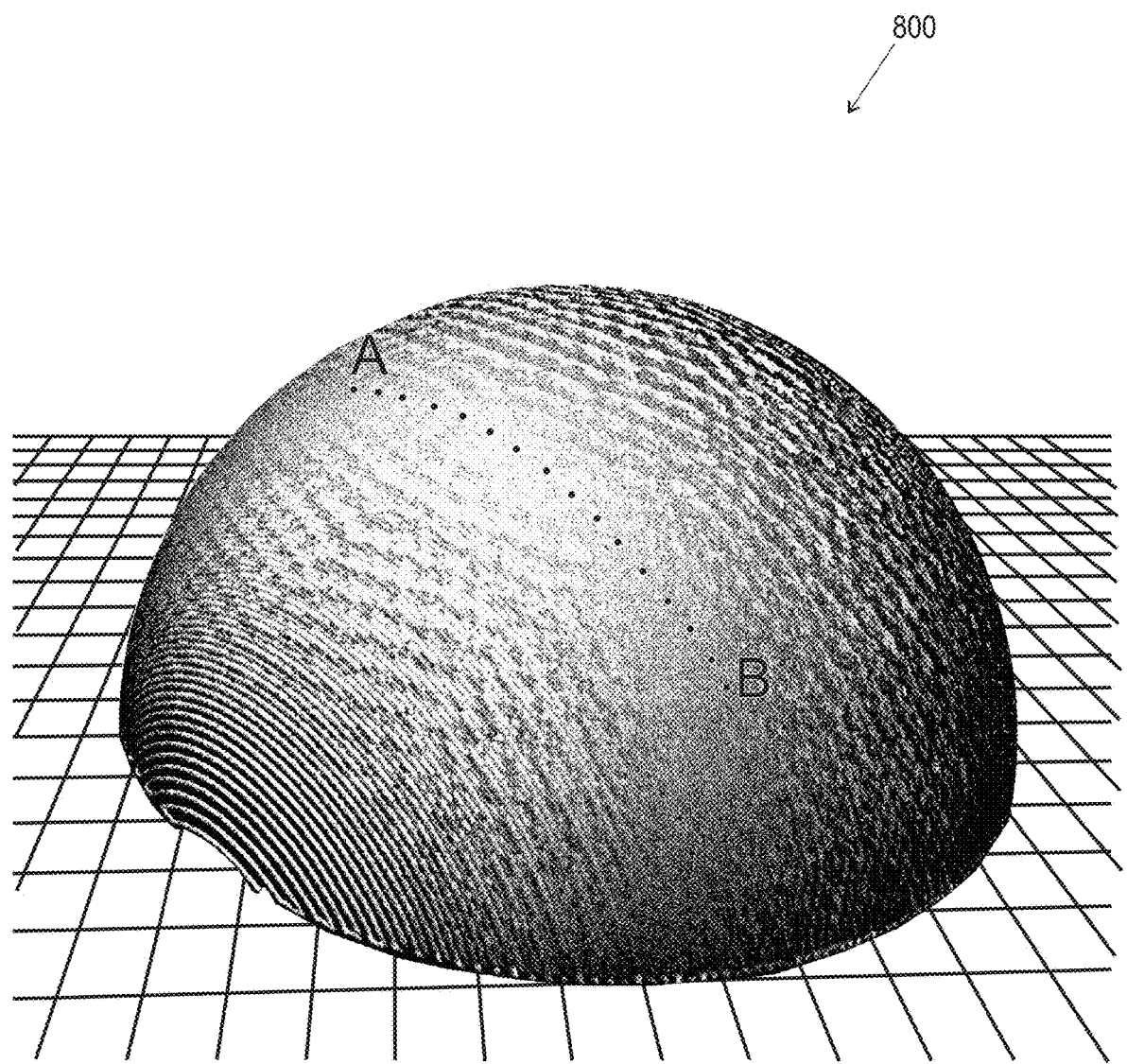
FIG. 8 shows a three dimensional article of manufacture, a dome, made in accordance with the present invention.

Controller 101 comprises the hardware and software necessary to direct, robot 121, deposition head 122, and turntable 110, in order to fabricate an article such as, three dimensional article 800 of FIG. 8.

Figure 2A:
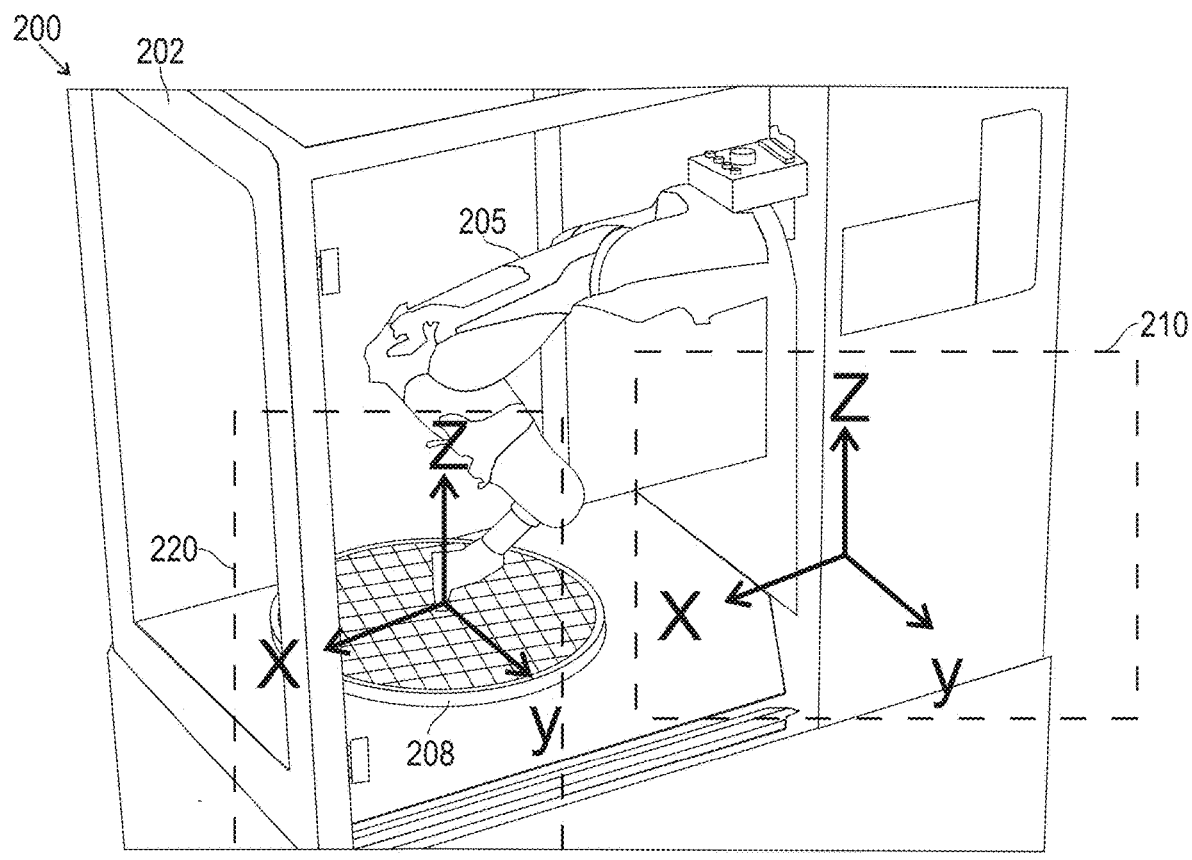
FIG. 2A shows a perspective view of a robot arm, wrist and hand of a wall-mounted robot which is an alternative to the robot of FIG. 1 with a rotatable work table and static world coordinate and work table coordinate frames in accordance with the present invention.

A build chamber 202 shown FIG. 2A may satisfactorily be a thermally-insulated, temperature-controlled environment in which an article is fabricated, and may also be used in conjunction with system 100 if so desired.

Turntable 110 comprises a stepper motor—under the control of controller 101—that is capable of rotating build plate 111 and, consequently the article around the z-axis (i.e., orthogonal to the build plate). In particular, turntable 110 is capable of:

1. rotating build plate 111 clockwise around the z-axis from any angle to any angle, and
ii. rotating build plate 111 counter-clockwise around the z-axis from any angle to any angle, and
iii. rotating build plate 111 at varying rates, and properly synchronized with movement of deposition head 122 as desired for a particular application, and
iv. maintaining (statically) the position of build plate 111 at any angle.

Build plate 111 is a platform comprising hardware on which the article is fabricated. Build plate 111 is configured to receive heated filament deposited by deposition head 122.

Robot 121 is capable of depositing a segment of fiber-reinforced thermoplastic filament from any three-dimensional coordinate in a work volume to any other three-dimensional coordinate in the work volume with deposition head 122 at any approach angle as addressed further below.

To this end, robot 121 comprises a multi-axis mechanical arm that is under the control of controller 101. Software for controller 101 generates tool paths to create three dimensional articles of manufacture as addressed further herein. The mechanical arm comprises first arm segment 123, second arm segment 124, and third arm segment 125. The joints between adjoining arm segments are under the control of controller 101. A non-limiting example of robot 121 is the IRB 4600 robot offered by ABB.

The mechanical arm of robot 121 can move deposition head 122 in:

1. the ±x direction,
ii. the ±y direction,
iii. the ±z direction
iv. $\pm\theta_y$—rotation about x-axis,
v. $\pm\theta_y$—rotation about y-axis,
vi. $\pm\theta_z$—rotation about z-axis, and
vii. any combination of i, ii, iii, iv, v, and vi, while rotating the approach angle of deposition head 122 around any point or temporal series of points. While the present application is explained utilizing an x, y, z coordinate system, it will be appreciated the present teachings can be translated to other coordinate systems if desired. Further, while the robot 121 can be controlled as addressed above, it can also be more simply implemented and controlled more simply in an xy plane and then stepped up a step in the z plane, an operation sometimes referred to as 2.5D. However, the three dimensional printing contemplated herein includes three dimensional travel along the tool path for at least some portion of the printing.

Deposition head 122 comprises hardware that is under the control of controller 101 and that deposits fiber-reinforced thermoplastic filament 131. One suitable deposition head 122 is described in detail in pending United States Patent Applications:

(i) Ser. No. 15/827,721, entitled "Filament Guide," filed on Nov. 30, 2017 and now issued as U.S. Pat. No. 10,076,870;
(ii) Ser. No. 15/827,711, entitled "Filament Heating in 3D Printing Systems," filed on Nov. 30, 2017 now issued as U.S. Pat. No. 10,195,786;
(iii) Ser. No. 15/854,673, entitled "Alleviating Torsional Forces on Fiber-Reinforced Thermoplastic Filament," filed on Dec. 26, 2017 and now issued as U.S. Pat. No. 10,046,511;
(iv) Ser. No. 15/854,676, entitled "Depositing Arced Portions of Fiber-Reinforced Thermoplastic Filament," filed Dec. 26, 2017;

all of which are incorporated by reference in their entirety and particularly for the purpose of describing additive manufacturing system 100 in general, and deposition head 122 in particular. The following patent applications are incorporated by reference for their description of how to make and use additive manufacturing system 100:

U.S. patent application Ser. No. 15/438,559, filing date Feb. 21, 2017;

U.S. patent application Ser. No. 15/375,832, filing date Dec. 12, 2016 now issued as U.S. Pat. No. 10,011,073;

U.S. patent application Ser. No. 15/232,767, filing date Aug. 9, 2016 now issued as U.S. Pat. No. 9,656,429;

U.S. patent application Ser. No. 14/574,237, filing date Dec. 17, 2014; and

Unites States Patent application Ser. No. 14/623,471, filing date Feb. 16, 2015 now issued as U.S. Pat. No. 9,895,845.

Filament conditioning unit 129 comprises hardware that pre-heats filament 131 prior to deposition.

Filament 131 comprises a tow of reinforcing fibers that is substantially parallel to its longitudinal axis. In accordance with the illustrative embodiments, filament 131 comprises a cylindrical towpreg of contiguous 12K carbon fiber that is impregnated with thermoplastic resin. Thermoplastic filament 131 comprises contiguous carbon fiber, but it will be clear to those skilled in the art, after reading this disclosure, how to make and use alternative embodiments of the present invention in which thermoplastic filament 131 has a different fiber composition.

It will be clear to those skilled in the art, after reading this disclosure, how to make and use alternative embodiments of the present invention in which filament 131 comprises a different number of fibers (e.g., 1K, 3K, 6K, 24K, etc.). It will be clear to those skilled in the art, after reading this disclosure, how to make and use alternative embodiments of the present invention in which the fibers in filament 131 are made of a different material (e.g., fiberglass, aramid, carbon nanotubes, etc.).

In accordance with the illustrative embodiments, the thermoplastic is, in general, a semi-crystalline polymer and, in particular, the polyaryletherketone (PAEK) known as polyetherketone (PEK). In accordance with some alternative embodiments of the present invention, the semi-crystalline material is the polyaryletherketone (PAEK), polyetheretherketone (PEEK), polyetherketoneketone (PEKK), polyetheretherketoneketone (PEEKK), or polyetherketoneetherketoneketone (PEKEKK). As those who are skilled in the art will appreciate after reading this specification, the disclosed annealing process, as it pertains to a semi-crystalline polymer in general, takes place at a temperature that is above the glass transition temperature, Tg.

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), poly(p-phenylene sulfide) (PPS), etc.) or a mixture of a semi-crystalline polymer and an amorphous polymer.

When the filament comprises a blend of an amorphous polymer with a semi-crystalline polymer, the semi-crystalline polymer can be one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC). As those who are skilled in the art will appreciate after reading this specification, the disclosed annealing process, as it pertains to a blend of an amorphous polymer with a semi-crystalline polymer, takes place generally at a lower temperature than a semi-crystalline polymer with the same glass transition temperature; in some cases, the annealing process can take place at a temperature slightly below the glass transition temperature.

When the filament comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed article.

In some alternative embodiments of the present invention, the filament comprises a metal. For example, and without limitation, the filament can be a wire comprising stainless steel, Inconel® (nickel/chrome), titanium, aluminum, cobalt chrome, copper, bronze, iron, precious metals (e.g., platinum, gold, silver, etc.).

In light of the present teachings, it will be clear to those skilled in the art how to make and use controller 101 to generate tool paths to provide true three dimensional printing in additive manufacturing as addressed further below. More particularly, like most typical three dimensional printing processes, a part to be printed is designed utilizing computer aided design (CAD) software. Once the design is finalized, that design is exported as a standard triangle or tessellation language (STL) file in which the part geometry is represented as a collection of triangles on the surface of the part joined at their edges. The STL file provides all the necessary geometric information to slice the part into layers.

Slicing software typically takes an STL file as input and slices the part into layers of toolpath and generates a sequence of points or toolpath that the tool has to travel to, along with special process specific event triggers.

This slicing process is typically done by generating a text file with Gcode.

A control system inside a typical 3D printer, such as controller 101, is designed to read the Gcode one line at a time and command the robot motors to move the appropriate distance. There is no need for an interpreter. But, a robot is not typically designed to read Gcode. It can only take motion commands in its own robot programming language. Thus, controller 101 is advantageously designed to convert Gcode into a text file that the robot can interpret to execute motion and input/output (IO) commands.

A presently preferred robot 121 for use as the robotic platform is an ABB 6-axis robot. It is mounted in a work area with a work table, such as turntable 110 and deposition build plate 111, in front and a fused deposition modeling (FDM) style extruder such as deposition head 122, attached to the wrist of the robot arm. For every print job, the robot 121 receives the text files from the converter in controller 101.

"True 3D" printing is 3-dimensional printing that utilizes all the 6 degrees of freedom to achieve freedom in fiber print orientation along any direction. Such printing preferably utilizes a toolpath dictated by stress optimization. A 6-axis robotic arm is advantageously utilized as the platform for true 3D printing. It has the same heated extrusion technology as regular FDM 3D printing, but with added ability to print with 6 degrees of freedom. That means the points that the deposition head is commanded to move to, not only have X, Y and Z information, but also tool orientation about the X, Y and Z axes depending on the orientation of the surface that is being printed. Thus, the deposition head 111 is not always normal to the work table and the layers need not be planar and stacked up in z direction like the traditional FDM printing. The layers can be formed as three dimensional surfaces and can be stacked up in any direction.

A point of extrusion in Gcode is represented as shown in an example line of Gcode: G1 X8.42368 Y6.55632 Z8.14732 F3600 E3763.82051 A-1.59 B31.28. The G1 command probably makes up 95% of a 3D printer Gcode file. The G1 command tells the deposition head 122, for example, to move in a straight line to the location specified by the X, Y and Z coordinates. This command can be used to move just a single axis, or multiple axes at once. In this case, it moves the tip of the head and all the 6 axes move to a certain angle so that the tip moves linearly to the location specified by the X, Y and Z coordinates.

The extruder is controlled just like any other axis and E specifies how much to extrude or retract filament from the nozzle. F specifies the speed of the deposition head. In this case, speed of the tip of the nozzle attached to the robot wrist is specified. A specifies how much the tool should turn around the tool tip about the X axis of the work table as discussed further below. B specifies how much the tool should turn about the Y axis. C specifies how much the tool should turn about the Z axis.

A combination of A and B, or B and C, or C and A are enough to get the tool aligned normal to a part. A and B are generally used to define the orientation of the tool with respect to the work table. A and B are generally used for 5 axis computerized numerical control (CNC) machining where the tool has 2 extra degrees of freedom, one is rotation about the X axis of the work table and one is about the Y axis of the work table, apart from the specified X,Y and Z coordinates.

To best understand the present invention, it is helpful to define a number of coordinate systems. First is a world coordinate system, a static coordinate system that is used as a reference for a work table coordinate system. Second is a work table or build plate coordinate system. The work table is defined by its position and orientation with respect to the world coordinate system. If it is a rotating coordinate system, it is defined accordingly with a center of rotation and axis of rotation, such that the robot controller constantly calculates its position and orientation based on its angle. Finally, a tool coordinate system is defined for the tip of the deposition head. This coordinate system is defined in a coordinate frame at the end of the robot arm.

Figure 2B:
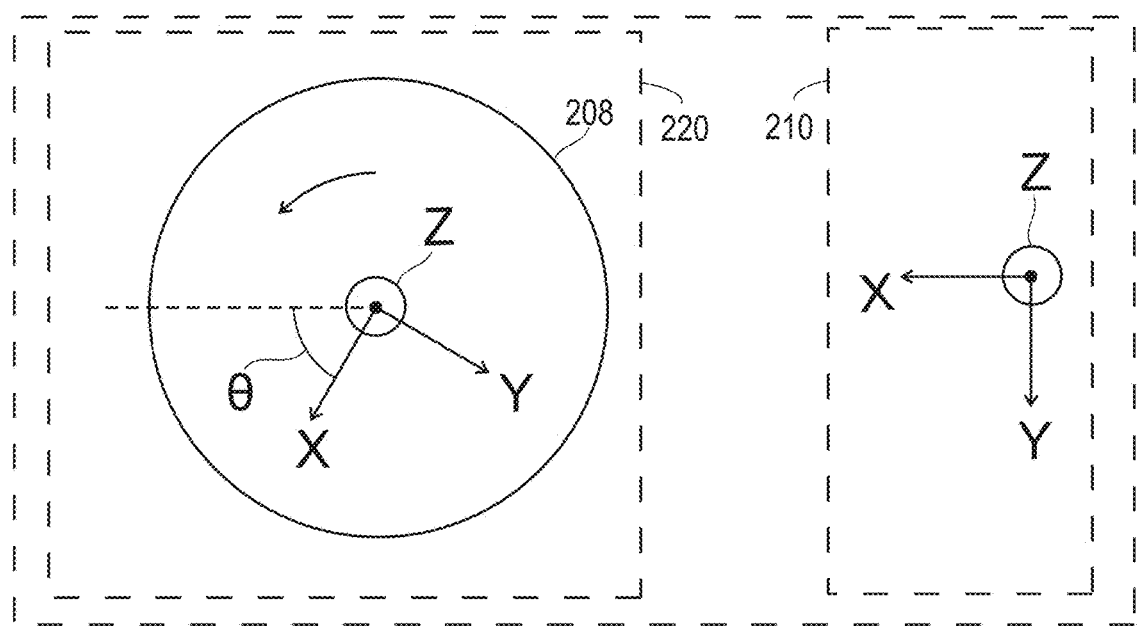
FIG. 2B shows a top view of the work table coordinate frame rotated by an angle θ with respect to the world coordinate frame.

For ease of illustration, FIG. 2A shows a perspective view of an alternative wall-mounted robot system 200 with a robot arm 205 and a work table 208. FIG. 2A shows both a static world coordinate frame 210 and a work table coordinate frame 220. FIG. 2B shows a top view of these two coordinate systems 210 and 220 with an angle θ representing rotation of the work table 208 with respect to the static world coordinate frame 220. The rotating work table coordinate frame is defined in terms of the static world coordinate as $$\text{wobj\_rotating table} = \begin{bmatrix} R & T \\ 1 & 0 \end{bmatrix} wobj0.$$

In the above equation, wobj0 is default work object frame and always coincides with the world coordinate frame. It is a reference coordinate frame for all other user coordinate frames in a cell, like the rotating buildplate coordinate frame, wobj_rotating table. Typically wobj0 coincides with the base of the robot, if not defined otherwise. R is a rotational matrix as defined further below and T is a translational matrix as addressed further below. It will be recognized that robots of a different size and configuration will have similar reach issues, and that the present invention is applicable to solving such reach issues generally.

Figure 3:
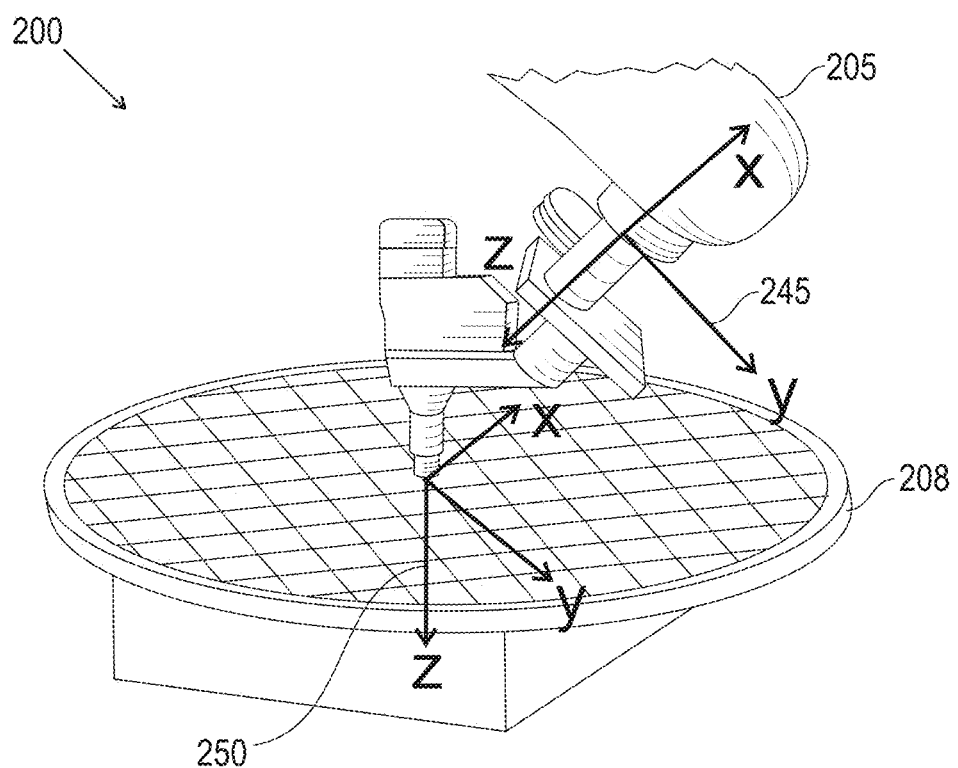
FIG. 3 shows a cutaway perspective view of the robot arm and tool printhead illustrating a tool0 coordinate frame and nozzle tool coordinate frame in accordance with the present invention.

FIG. 3 shows a further perspective view of the robot system 200 with part of arm 205 cutaway. A nozzle tool coordinate frame 250 is defined in terms of tool0 coordinate frame 245 as $$\text{tool\_nozzle} = \begin{bmatrix} R & T \\ 1 & 0 \end{bmatrix} tool0.$$

In the above equation, tool0 is default tool object which always coincides with the wrist coordinate system which is location at the center of the wrist of the robot. It is a reference coordinate frame for all other tool coordinate frame in a cell, like the nozzle tool coordinate frame, tool_nozzle. R is a rotational matrix as defined further below and T is a translational matrix as addressed further below.

Figure 4:
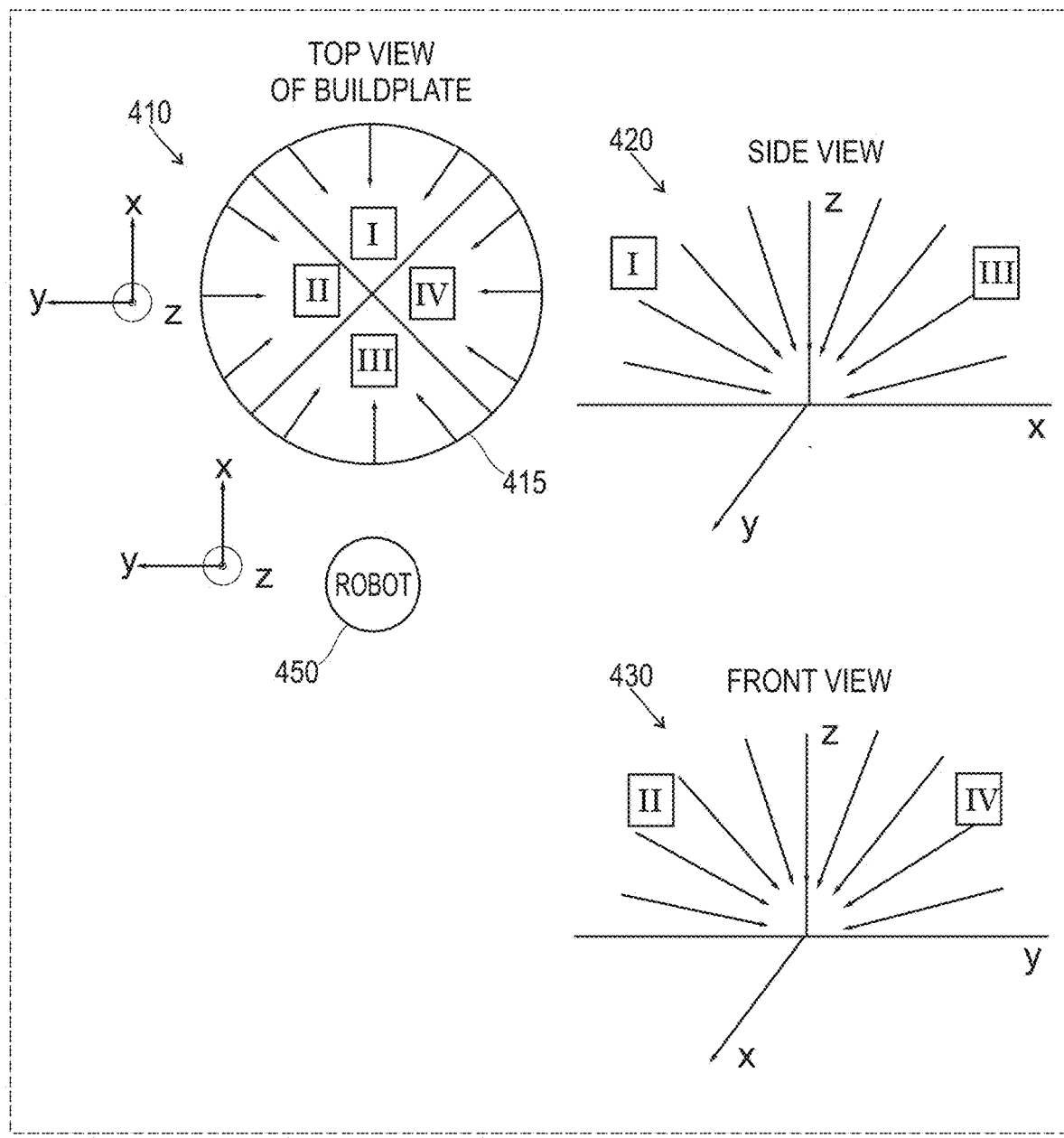
FIG. 4 shows a top view of the build plate divided into four quadrants and the robot of FIG. 2A represented symbolically with front and side views of four quadrants of the build plate with quadrants I and III fully reachable and quadrants II and IV not fully reachable.

While true 3D printing is being done by 6 axis robots, a 6-axis robot by itself has a limited reach and cannot achieve the orientation requirements of true 3D printing resulting from the tool having to be normal to the part at all times. The same is true for the system 200 of FIG. 2A. That means the nozzle needs to be able reach a target oriented along a range of vectors as depicted in FIG. 4. which shows a top view 410 of build plate 415, a side view 420 and a front view 430 with the range of vectors the nozzle of a robot 450 needs to reach. The vector directions shown in quadrant II and IV are reachable for the robot 450, but the vectors shown in quadrants I and III are unreachable as the robot runs out of the joint angles required to reach them. As will be understood by those of ordinary skill in the art, inverse kinematics can be employed to predict how and where a system such as the one addressed herein will run out of joint angles. The same is true with respect to alternative systems with which the present invention may be advantageously employed. As addressed further herein, the present invention addresses advantageous techniques to increase robot reach using buildplate rotation.

To enhance the reach in true 3D applications, in accordance with the present invention, a rotating platform is used so that the pitch part of the resultant tool orientation is transferred to the rotating work object so that the tool is only orienting in the A direction, that means the tool is only tilting about global X axis, quadrant II or quadrant IV. This approach is called limiting tool rotation about Y. If the tool's tip were to be unable to reach quadrants II and IV, then the roll part of the tool control would be utilized to turn the buildplate thereby restricting the tool orientation to rotation about the Y axis. This adjustment would be called limiting tool rotation about X.

Turning to limiting tool rotation in Y, as mentioned earlier, target points are represented using both their position and orientation in Gcode. X, Y, Z specify position. Combinations of A, B and C specify the tool orientation. The robot's way of understanding targets is using X, Y, Z coordinates and quaternions q1, q2, q3 and q4. A quaternion is just a more concise way to describe the rotational matrix with the quaternions being calculated based on the elements of the rotational matrix R as follows:

$$R = \begin{bmatrix} M_{00} & M_{01} & M_{02} \\ M_{10} & M_{11} & M_{12} \\ M_{20} & M_{21} & M_{22} \end{bmatrix}.$$

and $Q=[q_x, q_y, q_z, q_w]$, where $q_w = \sqrt{(1+M_{00}+M_{11}+M_{22})}/2$, $q_x = ((M_{21}-M_{12})/4) \times q_w$, $q_y = ((M_{02}-M_{20})/4) \times q_w$, and $q_z = (M_{10}-M_{01}/4) \times q_w$.

As a result, each target point that is represented in Gcode is converted into a data structure containing the X, Y, Z and the quaternion derived from the rotational matrix formed by the A, B angles. If A and B are zeroes, then the quaternion is [1,0,0,0] which is a unity quaternion.

After this step, the tool orientations by different axes are calculated to manipulate the tool orientation quaternion and buildplate angle.

The function quaternion (UnitX, Angle) creates a quaternion from a vector and an angle to rotate about the vector.

More particularly, target orientation=quaternion (Unit Z, C)*quaternion (Unit X, A)*quaternion (Unit Y, B).

Transform vector unit Z by quaternion target orientation, a vector oriented in the same way as the target is generated as addressed below $$V = k_x \hat{x} + k_y \hat{y} + k_z \hat{z}$$

$$\theta_z = rot_z = a\tan 2(k_x, k_y) = \tan^{-1}(k_x/k_y)$$

$$\theta_x = rot_x = \cos^{-1}(k_z) \text{(after the first rotation)}$$

Figure 5:
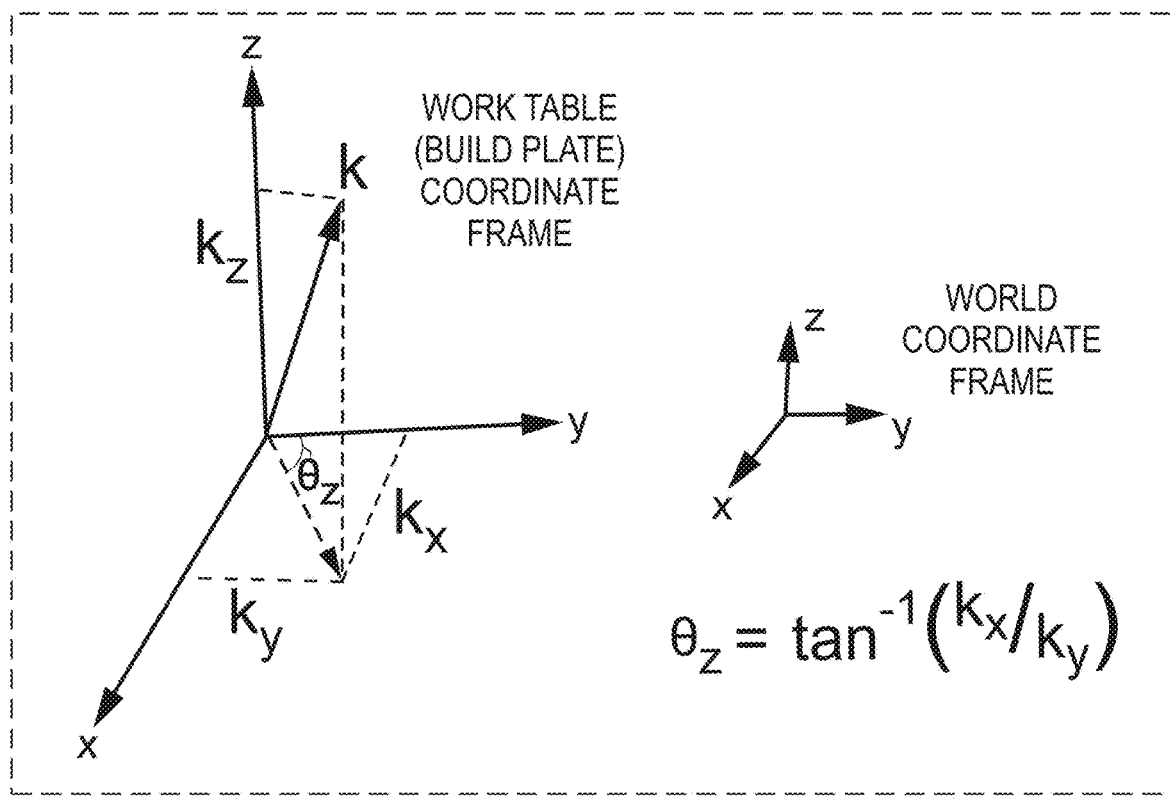
FIG. 5 illustrates a world coordinate system and a work object coordinate system relative to the world coordinate system with vector k representing the pose vector of the tool.
Figure 6A:
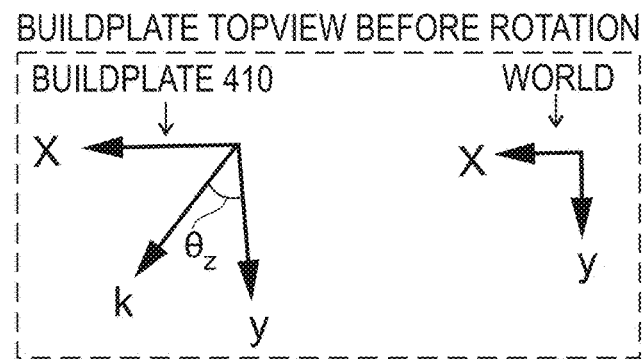
FIG. 6A shows the work table coordinate system and the world coordinate system prior to rotation.
Figure 6B:
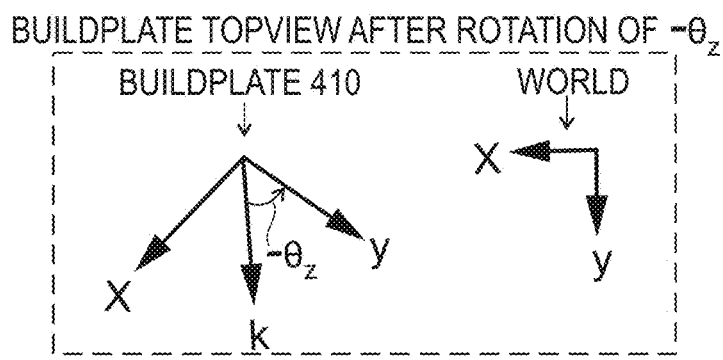
FIG. 6B shows the work table coordinate system and the world coordinate system illustrating an angle $-\theta_z$ of build-plate rotation that orients the vector of FIG. 5 along world axis y.

With reference to FIG. 5 which illustrates the world coordinate system and a work object coordinate system relative to the world coordinate system with vector k representing the pose vector of the tool and FIGS. 6A and 6B which show a buildplate top view prior to and after an angle $-\theta_z$ of buildplate rotation that orients the vector of FIG. 5 along the world axis $\theta_z = \tan^{-1}(k_x/k_y)$. If limiting tool rotation about y axis, then rotate buildplate by $-\theta_z$ so that the vector now completely orients along world y axis. As illustrated by FIGS. 6A and 6B, orienting in world y axis puts the tool in quadrant II or quadrant IV which are reachable.

Now the tool still tries to achieve the orientation of the vector, but since the work table is turned by $-\theta_z$, the tool also turns by $-\theta_z$ to orient with the vector, which is not necessary since the tool rotation in its Z axis does not affect the printing process. This extra rotation $\theta_z$ causes the robot arm to extend itself more than necessary. This unnecessary extension is avoided by turning the target orientation by $+\theta_z$ and now the vector is accessible to the tool both by position and orientation. Expressed mathematically:

$$\text{Target orientation} = \text{Target orientation} * \text{Quat(Unit } z, \theta_z)$$

This translation is done for every line of Gcode, which results in an articulated motion where the buildplate is continuously turning as needed to make the part reachable for the robot and the tool is able to reach the part and print it.

As one example, consider this line of Gcode:

G1 X-47 Y16 Z29 F3600 E0.043 A-72.01 B-70.93

This Gcode wants the tool to go to a point [−47, 16, 29] with a tool tilted about the x-axis by −72.01 degrees and tilted about the y-axis by −70.93 degrees. The point [−47, 16, 29] is reachable. But the tool approach which is [−72.01, −70.93, 0] is not reachable for the tool as it cannot turn by these angles without running out of joint angles.

Target orientation quaternion=quaternion(Unit2,C)
*quaternion(Unit4,B)*quaternion(Unit X,A).

As per the Gcode,
A=−72.01°
B=−70.93°
C=0
Target orientation quaternion, $Q_{tool}$=Quat ([0, 0, 1], 0)*
Quat ([0, 1, 0], −70.93)*
Quat ([1, 0, 0], −72.01)
=[1, 0, 0, 0] *[0.81447, 0, 0, −0.58020] * [0.8089, 0.58786, 0, 0]
=[0.6589, −0.47879, −0.469366, 0.341]

This quarternion is referred to as $Q_{tool}$.

Next, it is necessary to create a vector which has the orientation as represented above, $Q_{tool}$. If a current angle of buildplate is $\theta_{old}$=−70.67°, then $\theta_{new}$=−71.79°.

Figure 7:
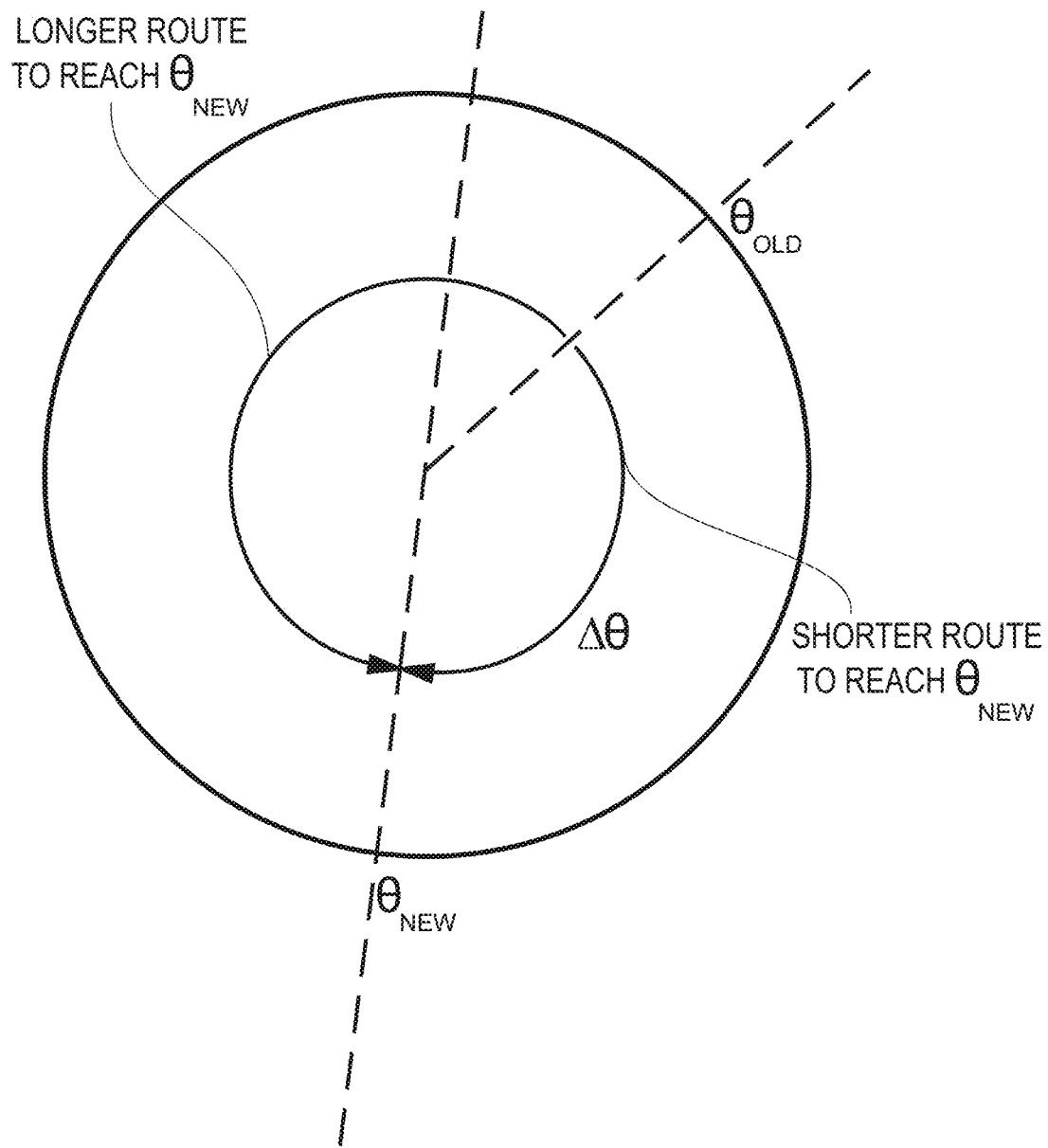
FIG. 7 illustrates $\Delta\theta$, the shortest angle to ensure the build plate takes the shortest route to reach the angle $\theta_{new}$ from $\theta_{old}$.

$\Delta\theta$=Shortest angle ($\theta_{new}-\theta_{old}$) where the shortest angle is employed to make sure that the buildplate takes the shortest angular route to reach the next angle as shown in the example of FIG. 7. In this case, $\Delta\theta$ for the shortest angle is if $\theta_{diff}=\theta_{new}-\theta_{old}$=−71.79+70.67=−1.12° $\Delta\theta$=Min (−1.12, 360°−1.12°)=−1.12° and $\theta_{new}=\theta_{old}+\Delta\theta$=−70.67°−1.12°=−71.79° which in this case is the same as the original $\theta_{new}$, but that is not necessarily the case. Thus, −71.79° is the new buildplate angle. That means the buildplate coordinate system is rotated by −71.79°, and the tool has to be rotated by 71.79°.

To achieve that combination, the tool orientation $Q_{tool}$ is transformed by the amount of buildplate angle, where $$Q_{tool}(\text{after rotation}) = Q_{tool}(\text{before rotation}) * [\text{Quat (Unit } Z, -C)]$$

$$= Q_{tool} * [0.81, 0, 0, 0.5864]$$

$$= [0.3337, -0.66306, -0.0995, 0.6626].$$

Now, the point X-47 Y16 Z29 is in reach for the robot because the buildplate rotated to make it enter the reach zone. And the tool approach is also reachable because the tool orientation was changed to make it reachable.

This quaternion represents [−80.04°, 54.33°, 79.92°] in Euler angles.

Comparing the original Gcode intended Euler angles, it is seen how different they are. But, in combination with buildplate rotation, both sets orient the tool the same way except for rotation about the tool axis which has no effect on the part in FDM processes.

One exemplary result utilizing the above process is the article 800 shown in FIG. 8. To design an article of manufacture, such as article 800 shown in FIG. 8, a human designer uses a computer-aided-design system (e.g., Dassault Systèmes Solid Works®, etc.) to specify the desired spatial, structural, and other physical properties of the article of manufacture, in this case, a semi spherical dome. One example of the teachings of the present invention addresses orientation of the work table to print point A and point B shown in FIG. 8.

$G_{code}$ defines point A: G1 x-19.87 y-12.84 z 70.155 F3600 E22173.23 A15.82 B-22.86. This $G_{code}$ wants the tool to go to point [−19.87, −12.84, 70.155] with the tool tilted about x-axis by 15.82° and about y-axis by −22.86°.

Target orientation quaternion of the tool is represented by $Q_{tool}$
$Q_{tool}$=Quat (Unit z, C)
Quat (Unity, B)
Quat (Unit x, A)
Where Quat is a vector that represents an orientation
$Q = [q_x, q_y, q_z, q_w]$
As per the gcode, A=15.82°, B=−22.86°, C=0
$Q_{tool}$=Quat ([0,0,1], 0)*Quat ([0,1,0], −22.86°)*Quat ([1,0,0], 15.82°)
=[0.97084, 0.13489, −0.19628, 0.02727]
$Q_{tool}$ in vector representation is
k=[−0.38848, −0.2512, 0.8865] in [x,y,z]
Required buildplate angle=$\tan^{-1}(k_x/k_y)$
=−122.89°
$Q_{tool}$ (after rotation)=$Q_{tool}$ (before rotation)*Quat (Unit z, −C)

=[0.97084, 0.13489, −0.19268, 0.02727]
*[0,0,0.878, 0.478]
=[−0.488, 0.108, 0.212, −0.0840]

This result represents Euler angles of [59.966°, 1.488°, −27.520°]
Together with buildplate rotation of −122.89°, it sets the tool the same way as desired except for an extra rotation about the z-axis which doesn't have any effect on the part in FDM processes.

This quaternion is transformed to the world coordinate frame to get an idea of how the angle by which the robotic arm rotates changes as follows: the quaternion $Q_{tool}$ (world frame)=[−0.138, 0.480, 0.839, −0.215] is calculated which represents Euler angles of [59.966°, 1.488°, −150.409°] in [x,y,z]. It can be seen that the angle about y has been reduced to 1.488° as compared to the original −22.86°, making the point approachable in the orientation as desired by the $G_{code}$ as the tool is in quadrent II.

Similarly, $G_{code}$ defines point B:G1x3.29 y-36.54 z 60.40 F3600 E22169.293 A45.75 B3.68
$Q_{tool}$=Quat (Unit z, C)*Quat (Unit y, B)*Quat (Unit x, A)
A=45.75°, B=3.68°, C=0
$Q_{tool}$=Quat ([0,01], 0)*Quat ([0,1,0], 3.68°)*Quat ([1,0,0], 45.75°)
=[0.9208, 0.3885, 0.0296, 0.0125]
$Q_{tool}$ in vector representation is
k=[0.0642, −0.7148, 0.6963]
Required buildplate angle=$\tan^{-1}$ ($k_x/k_y$)
=$\tan^{-1}$ (0.0642/−0.7148)
=174.86°.
$Q_{tool}$ (after BP rotation)=$Q_{tool}$ (before rotation)*Quat (Unit z, −C)
=[0.9208, 0.3885, 0.0296, 0.0125]
*[0,0,−0.9789, 0.0447]
=[0.053687, −0.012163, 0.389, −0.919]
=[0.0537, −0.0122, 0.389, −0.919].
Euler angles representation=[−6.219°, −1.110°, −45.824°]
$Q_{tool}$ (world frame of reference)=[−0.00974, 0.05414, 0.90126, 0.4295]
Euler angle representation=[5.131°, 3.674°, 129.2°] (x,y,z)
Therefore, the rotation about y has not changed much from the original since the original y rotation as desired by the $G_{code}$ was already reachable. So the process of the present invention worked out in a way that the point that is reachable remained in the reachable zone, albeit on the other side due to buildplate rotation of 174.86° as the tool is in quadrent IV.

Figure 9:
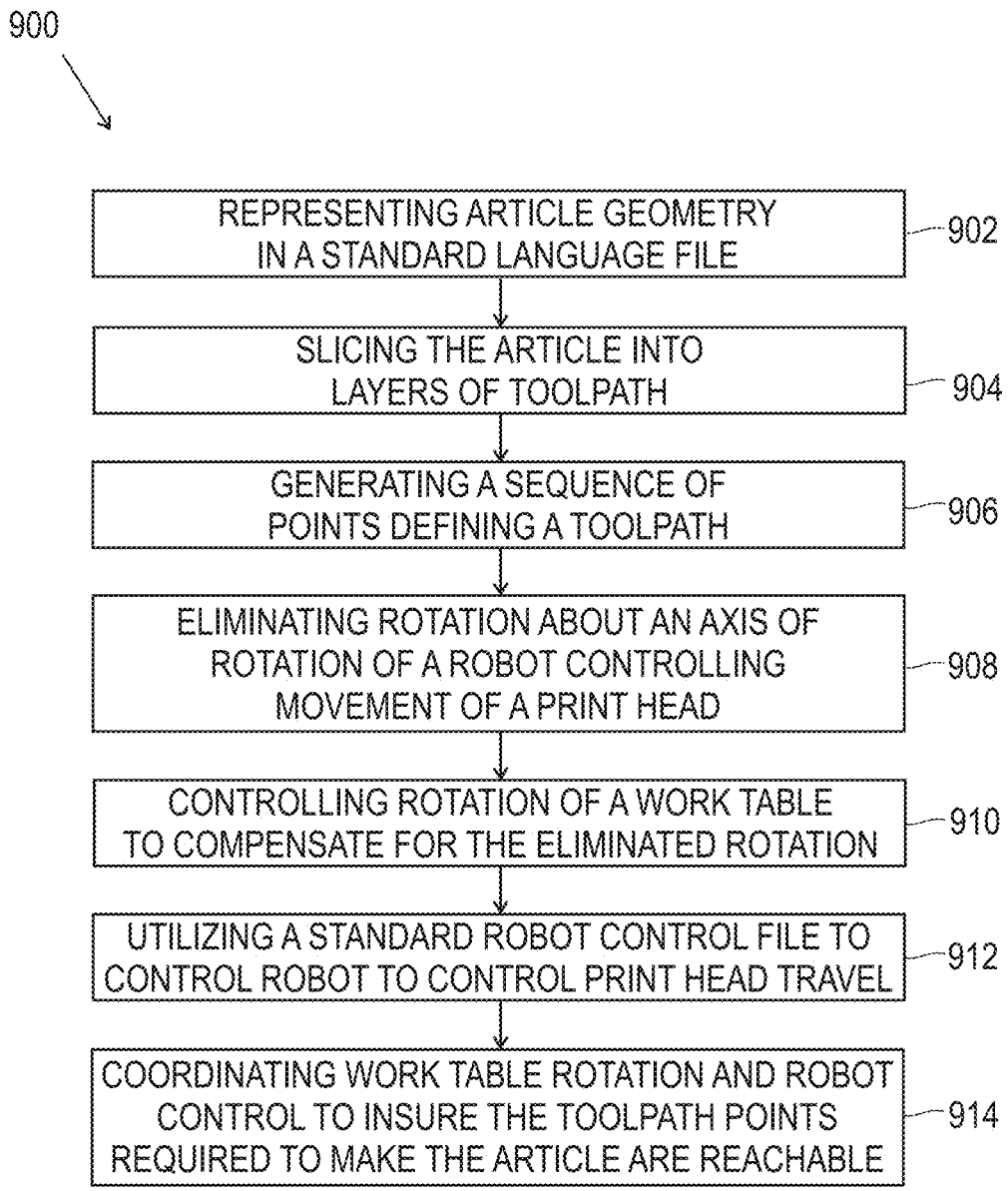
FIG. 9 shows a process of extending the reach of a robot, such as the robot of FIG. 1 or FIG. 2A, for example, in accordance with the present invention.

FIG. 9 shows a process 900 in accordance with one embodiment of the present invention for generating an article of manufacture formed by three dimensional printing utilizing a controllable print head which prints lengths of fiber reinforced filament along an article tool path to form the article where said tool path is generated as discussed further below. The process 900 may also be utilized in conjunction with a three dimensional printer to extend the reach of said printer. As seen in FIG. 9, process 900 begins by representing part geometry in a standard language file. For example, computer aided design software may be utilized to represent part geometry in a standard language file, such as STL as addressed further herein. In step 904, the article is sliced into layers of toolpath. For example, slicing software may be employed to take the standard language file and slice the article into layers of toolpath.

In step 906, a sequence of points defining a toolpath is generated. In a presently preferred embodiment, this toolpath includes portions which are truly three-dimensional, such as points along the hemisphere 800 of FIG. 8, and the sequence of points may be suitably specified in a Gcode file as addressed further herein.

In step 908, rotation about an axis of rotation of a robot controlling movement of a print head is eliminated. For example, rotation about an x-axis or a y-axis of the robot 121 of FIG. 1, the robot of robot system 200 of FIG. 2 or robot 450 of FIG. 4A is eliminated by converting the Gcode file to an alternate Gcode file as discussed further herein.

In step 910, rotation of a work table is controlled to compensate for the eliminated rotation. For example, work table control code may be suitably added to the alternate Gcode file to provide for the desired rotation of a work table, such as work table 250 of FIG. 3, for example. In a presently preferred embodiment, the alternate Gcode file is converted to a standard robot control file, such as a text file the robot can interpret to execute motion and input and output (TO) commands to control printhead travel.

In step 912, a standard robot control file is utilized to control printhead travel, and in step 914, work table rotation and robot control are coordinated to insure the toolpath points required to make the article are reachable. For example, the alternate Gcode file is utilized to control the work table to rotate in a manner insuring the toolpath points that are required to make the article are reachable.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

For example, while the present invention is described in the context of presently preferred systems and materials, it will be recognized that these systems and materials are likely to evolve with time and that the disclosed solutions to problems are generally applicable to additive manufacturing contexts, where these problems arise. As one example, while the invention has been described in terms of a particular robot, it will be recognized that the principles described can be adapted to many alternative arrangements. For example, where a printhead moves with respect to a work table which is mounted on the robot, the present invention may be adapted to increase the work volume as addressed herein.

Also, while several of the originally filed claims are directed to articles of manufacture, it will be understood that machines and processes are described herein and may also be claimed by this application or a continuation hereof.

What is claimed is:

1. An article of manufacture formed by three dimensional printing utilizing a controllable print head which prints lengths of fiber reinforced filament along a toolpath to form the article, wherein the toolpath is generated by a process comprising:

utilizing computer aided design software to represent part geometry in a standard language file, wherein the standard language file is a standard triangle or tessellation language (STI) file providing all necessary geometric information to slice the article into layers;

utilizing slicing software to take the standard language file and slice the article into layers of toolpath;

for each layer of toolpath, generating a sequence of points defining a toolpath in a Gcode file;

converting the Gcode file to an alternate Gcode file that eliminates rotation about at least one axis of rotation of a robot controlling movement of the print head and adds work table control code to control rotation of a work table;

converting the alternate Gcode file to a text file the robot can interpret to execute motion and input/output (IO) commands to control print head travel; and utilizing the alternate Gcode file to control the work table to rotate in a manner ensuring the toolpath points that are required to make the article are reachable.

2. The article of manufacture of claim 1 wherein a shortest angle is computed from among (i) a first angle that corresponds to a first angular route and (ii) a second angle that corresponds to a second angular route, and to ensure the work table takes a shortest angular route to reach a next angle of rotation to ensure a subsequent toolpath point is reachable.

3. The article of manufacture of claim 1 wherein the process is repeated for the sequence of points.

4. A method of printing a three dimensional article fabricated from a series of additive material runs, utilizing a, print head, the additive material runs comprising lengths of fiber reinforced filament, the method comprising:

representing geometry of the article in a standard language file, wherein the standard language file is a standard triangle or tessellation language (STL) file providing all necessary geometric information to slice the article into layers;

slicing the article represented in the standard language file into layers of toolpath;

generating a sequence of points defining a toolpath in a Gcode file, for each layer of toolpath;

converting the Gcode file to an alternate Gcode file that eliminates rotation about at least one axis of rotation of a robot controlling movement of the print head and adds work table control code to control rotation of a work table;

converting the alternate Gcode file to a text file the robot can interpret to execute motion and input/output (IO) commands to control print head travel;

eliminating the rotation about the at least one axis of rotation; and, controlling, using the alternate Gcode file, the rotation of the work table in a manner ensuring the toolpath points required to make the article are reachable.

5. The method of claim 4 wherein the representing step is performed utilizing computer-aided design software.

6. The method of claim 4 wherein the slicing step is performed utilizing slicing software to operate on the standard language file.

7. The method of claim 4 wherein the alternate Gcode file contains commands to control the work table.

* * * * *